July 14, 1959     S. M. DOBROSAVLYEVITCH     2,894,495
COMBUSTION CHAMBER IN A MONOVALVE DIESEL ENGINE WITH AIR COOLING
Filed June 7, 1957
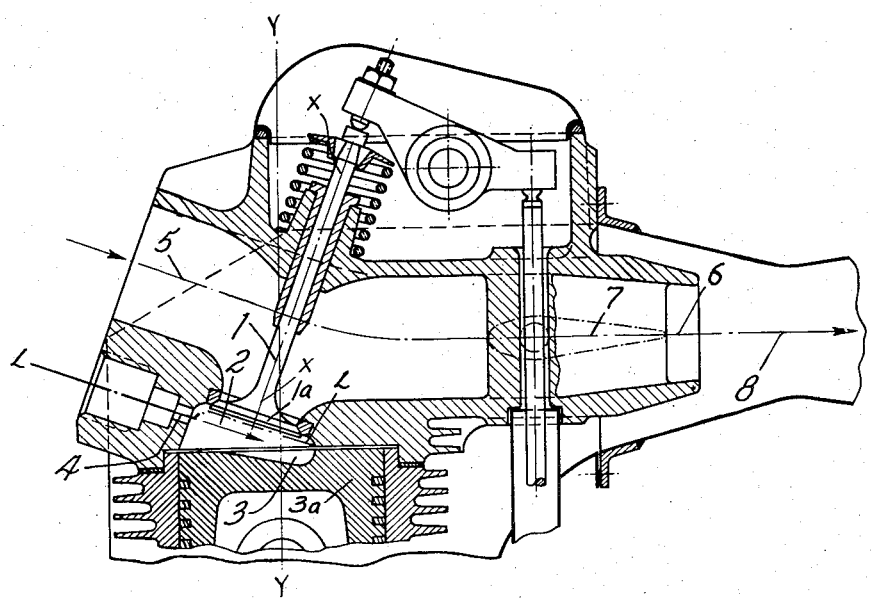
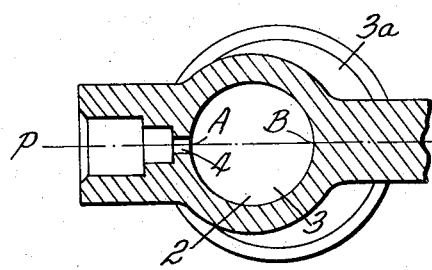
Inventor:
Slobodan M. DOBROSAVLYEVITCH
by: J Delatter-Sypry
Attorney 2,894,495
Patented July 14, 1959

2,894,495

COMBUSTION CHAMBER IN A MONOVALVE DIESEL ENGINE WITH AIR COOLING

Slobodan M. Dobrosavlyevitch, Beograd, Yugoslavia

Application June 7, 1957, Serial No. 664,428

Claims priority, application Yugoslavia February 15, 1954

4 Claims. (Cl. 123—32)

This is a continuation-in-part of my copending application Serial No. 503,943, filed February 15, 1955, now Patent No. 2,804,859, issued Sept. 3, 1957.

In said parent application, the invention related to improvements in monovalve four-stroke diesel engines with air cooling. The principal feature of said invention related to a new design of the cylinder head of a four-stroke diesel engine with air cooling, improving materially all the main qualitative characteristics of these engines for automotive and light stationary applications.

This application relates more particularly to the design of the combustion chamber of the engines object of my aforesaid patent and the features of this application will appear from the following description and appended drawing.

My novel design of combustion chamber, for use in monovalve four-stroke diesel engines, as compared with previous designs of diesel engines, makes it possible to obtain, in a simple way, a more perfect combustion at considerably higher speed of revolution with relatively lower thermal stresses of the cylinder assembly.

In the drawing:

Fig. 1 is an elevational view, partly in cross-section, taken on the plane of symmetry of the cylinder, which plane of symmetry contains the axis of the cylinder, the axis of the combustion chamber and of the control valve;

Fig. 2 is a plan view, with parts in cross-section, of the combustion chamber, taken along line L—L of Fig. 1.

According to this invention and with reference to the drawing, the diesel engine comprises a vortex combustion chamber which is located excentrically of the cylinder head up to the periphery of the cylinder itself towards the injector 4. The combustion chamber is composed of a cavity 2 at the bottom of the cylinder head and in the form of a transversally tapering cross-section of a right circular cylinder coaxial with the axis XX of the valve 1 which is inclined towards the engine cylinder axis YY in the discharge direction; axis XX and axis YY define, and are contained in, a plane of symmetry PP (Fig. 2) common to the cylinder and to the combustion chamber 2 and diametral thereto; the maximum diameter of chamber 2, at the base thereof, is substantially smaller than the diameter of the cylinder; at the point of its wall, at its base, which point is in the plane of symmetry PP and is farthest away from the axis YY of the cylinder, combustion chamber 2 is substantially tangent to the wall of the engine cylinder, as shown in Fig. 2. Valve 1 has its control head 1a located inside the combustion chamber 2, and said head 1a is adapted to seat against the peripheral wall of the intake and discharge opening of the combustion chamber 2 at the top thereof (Fig. 1). Combustion chamber 2 may also be complemented, as shown in Fig. 1, by a cavity 3 in the crown of the piston, said cavity 3 corresponding to and cooperating with cavity 2 and being shaped in the form of a transversally tapering "horseshoe" or tapering shoe heel segment of a right circular cylinder, said segment being defined by a first cross-sectional plane at right angle to the axis of the cylinder and by a second cross-sectional plane inclined with respect to said axis and intersecting said first plane inside said cylinder. Fuel is injected into this combustion chamber in a conical jet approximately normal to the valve axis through the orifice 4 in the plane of symmetry of the cylinder on the side of the combustion chamber 2 where the chamber brim is tangent to the engine cylinder.

Thus, by the flow effect of the air in the cylinder at the end of the compression from the narrowed space between the plane of the cylinder head and the crown of the piston, into the eccentrically located combustion chamber, an atomization of the fuel spray will be produced accompanied by the generation of a double vortex, providing the best conditions for the achievement of a contact of the fuel particles with oxygen—which insures a high efficiency of combustion even at very high engine speeds.

This may be explained in greater detail as follows: the crown 3a of the piston, when in its top dead center position (hereafter shortened to TDC), is very close to the bottom of the cylinder head. The fuel-air mixture build-up and the combustion process in the described combustion chamber are based on an original flow mechanism.

As compared with the entirely symmetrical flow pattern which obtains in a combustion chamber arranged coaxially with the engine cylinder, in which during the compression stroke a radial inlet flow into the chamber takes place with constant speeds along the entire periphery, in the combustion chamber of this invention, located very eccentrically relatively to the cylinder, a progressive distortion of the flow pattern becomes evident in the space between the piston crown and the bottom of the combustion chamber as the piston comes nearer to the TDC; this distortion is accompanied by increasing differences in speeds of inlet flow at the chamber's circumference, the speeds being progressively decreased from point A to point B (Fig. 2) in either direction. While passing through the chamber herein, all flow lines of the air translatory motion, gravitating towards point A, are subjected, by deviation from a horizontal plane into a vertical direction, to a return motion, thus forming a turbulent vortex licking all surfaces of the chamber. The fuel is injected into the chamber 2 through orifice 4. The progressively built-up mixture of fuel and air, returning towards the orifice 4 under the influence of incoming air, will again come up against the flame front which has been initially started at the orifice of the fuel injector 4; this brings about a progressive combustion similar to that in the Otto cycle. In addition, as soon as the pressure increases due to combustion, the combustion products will begin to be discharged from the combustion chamber 2 into the space between the top face of the piston crown and the bottom of the cylinder head around point A where the potential is the lowest. This does not only alleviate the negative influence of the combustion products upon the fuel-air mixture build-up and upon the combustion itself, but also the pressure wave of the combustion products, while penetrating the said space, intensifies the inflow of air lagging in chamber 2 around point B, when near TDC a general decrease of potential difference occurs due to the rapid decrease of piston velocity to zero. The flow mechanism according to this invention is thus able not only to improve materially the regularity of the combustion process without violent shocks and smoke at relatively low air excess coefficients, but also to make it possible to achieve considerably higher engine speeds.

The axis XX of the combustion chamber may be inclined about 15° from the cylinder axis YY. On the basis of the foregoing, said inclination is justified in view of the location of the fuel injector on that side of the chamber where it is tangent to the cylinder periphery, and because it creates favorable conditions for the described deviation of gas flow lines, and for creating a vortex without heavy amortization of the kinetic energy of the air translatory motion in the chamber.

The stated characteristics of the combustion chamber insure that the air cooling mechanism attains a more regular and speedy process of combustion as compared with the existing systems.

I claim as my invention:

1. In a diesel engine, a cylinder; having a longitudinal axis and a plane of symmetry containing said axis and diametral in said cylinder; a cylinder head; a combustion chamber eccentrically located with respect to the axis of the cylinder and near the periphery of said cylinder and having its axis in the plane of symmetry of the cylinder; a valve in said combustion chamber and adapted to control the operation of said cylinder and having its axis contained in said plane of symmetry and inclined at an angle from the axis of the cylinder; a piston having a crown in said cylinder; said combustion chamber consisting of two parts: the first part in the cylinder head and in the form of a cylindrical cavity coaxial with the axis of the valve, and the second part in the piston crown and in the form of a second cylindrical cavity corresponding to and cooperating with the cavity in the cylinder head.

2. In a monovalve four stroke diesel engine, a cylinder having a longitudinal axis and a plane of symmetry containing said axis and diametral in said cylinder; a cylinder head having a bottom wall; a combustion chamber having the shape of a circular, substantially cylindrical, cavity cut in the bottom wall of the cylinder head, having its geometrical axis inclined at an acute angle from the cylinder axis, and located eccentrically with respect to said cylinder, said chamber having a bottom brim which is tangent to the periphery of the inner wall surface of the cylinder at a point located in said plane of symmetry, the geometrical axis of said cavity being contained in said plane of symmetry.

3. A diesel engine as claimed in claim 2 comprising further: a piston in said cylinder, said piston having a piston crown, and in said piston crown a second cavity complementing said cavity in the bottom wall of the cylinder head and forming an addition to said combustion chamber.

4. A diesel engine as claimed in claim 2, comprising further: a valve for charging and discharging said cylinder, having an axis coaxial with the geometrical axis of said combustion chamber, and having its head located inside said combustion chamber, said chamber having an upper intake and discharge opening, said valve being adapted to seat onto the peripheral wall of said opening; and a fuel injector adapted to inject fuel into said chamber and located on the side of said chamber which is tangent to the cylinder.

References Cited in the file of this patent

UNITED STATES PATENTS 2,214,941     Taub _____ Sept. 17, 1940

FOREIGN PATENTS 758,907     France _____ Jan. 26, 1934